US012366218B2

(12) United States Patent
Horn et al.

(10) Patent No.: US 12,366,218 B2
(45) Date of Patent: *Jul. 22, 2025

(54) LIQUID ROCKET ENGINE INJECTOR WITH VARIABLE FLOW AREA

(71) Applicant: Blue Origin Manufacturing, LLC, Huntsville, AL (US)

(72) Inventors: Mark David Horn, Maple Valley, WA (US); Adam Keith Norman, Maple Valley, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,709

(22) Filed: Jun. 3, 2024

(65) Prior Publication Data
US 2024/0318616 A1    Sep. 26, 2024

Related U.S. Application Data

(63) Continuation of application No. 18/313,137, filed on May 5, 2023, now Pat. No. 12,031,505, which is a (Continued)

(51) Int. Cl.
*F02K 9/52* (2006.01)
*F02K 9/42* (2006.01)
(Continued)

(52) U.S. Cl.
CPC ............ *F02K 9/52* (2013.01); *F02K 9/42* (2013.01); *F02K 9/58* (2013.01); *F02K 9/62* (2013.01)

(58) Field of Classification Search
CPC ..... F02K 9/42; F02K 9/52; F02K 9/58; F02K 9/62; F16K 31/122; F16K 31/1221;
(Continued)

(56) References Cited

U.S. PATENT DOCUMENTS

| 2,742,921 A | 4/1956 | Halford et al. |
| 2,916,046 A | 12/1956 | Turansky et al. |

(Continued)

FOREIGN PATENT DOCUMENTS

| GB | 671566 | 5/1952 |
| JP | 2000-297701 A | 10/2000 |

OTHER PUBLICATIONS

Achenbach E (1974) The effects of surface roughness and tunnel blockage on the flow past spheres. Journal of fluid mechanics 65:113-125.
(Continued)

*Primary Examiner* — William H Rodriguez
(74) *Attorney, Agent, or Firm* — Knobbe, Martens, Olson & Bear, LLP

(57) ABSTRACT

A variable flow area injector for a liquid rocket engine. The injector has a poppet with a variable outer width portion and a housing with a variable inner width portion. An annular flow path is defined between the variable width portions. Increased throttling of the engine passively increases the annular flow area of the injector by forcing the poppet in a distal direction. Decreased throttling allows a restoring spring to move the poppet in a proximal direction to decrease the annular flow area. A bellows can be included to dampen movement of the poppet. The bellows may be in a propellant-filled cavity separate from the main propellant flow path and have a series of openings through which the separate propellant flows.

19 Claims, 5 Drawing Sheets

Related U.S. Application Data continuation of application No. 17/453,580, filed on Nov. 4, 2021, now Pat. No. 11,643,995.

(51) Int. Cl.
*F02K 9/58* (2006.01)
*F02K 9/62* (2006.01)

(58) Field of Classification Search
CPC ...... F16K 31/126; F16K 31/1262; F16K 1/12; F16K 1/36; F16K 1/38; F16K 15/065; F02M 59/46; F02M 59/462
See application file for complete search history.

(56) References Cited

U.S. PATENT DOCUMENTS

| | | | |
|---|---|---|---|
| 3,064,903 A | 11/1962 | Butler | |
| 3,210,938 A | 10/1965 | Mendez | |
| 3,234,731 A * | 2/1966 | Buergin | F02K 9/52 60/741 |
| 3,408,816 A | 11/1968 | Stein | |
| 3,431,731 A | 3/1969 | Ferris | |
| 3,623,319 A | 11/1971 | Schneider | |
| 3,726,088 A | 4/1973 | Kretschmer et al. | |
| 3,742,701 A | 7/1973 | Feemster | |
| 3,848,806 A | 11/1974 | Samuelsen | |
| 3,871,173 A * | 3/1975 | McKenna | F02K 9/86 60/258 |
| 4,777,794 A | 10/1988 | Nielsen | |
| 4,782,660 A | 11/1988 | Domyan | |
| 5,224,343 A | 7/1993 | Steenborg | |
| 6,250,602 B1 | 6/2001 | Jansen | |
| 10,443,441 B2 | 10/2019 | Blumrich | |
| 11,643,995 B1 * | 5/2023 | Horn | F02K 9/52 60/205 |
| 12,031,505 B2 * | 7/2024 | Horn | F02K 9/58 |
| 2011/0219743 A1 | 9/2011 | Johnson et al. | |
| 2012/0132297 A1 | 5/2012 | Salehi | |
| 2016/0109035 A1 | 4/2016 | McCarty | |
| 2020/0182365 A1 | 6/2020 | Pellini | |

OTHER PUBLICATIONS

Barsotti et al. "Development of Liquid Oxygen/Liquid Hydrogen Thrust Chamber for the M-1 Engine." NASA CR-54813. AGC 9400-5. National Aeronautics and Space Administration. Contract NAS 3-2555. May 1968.

Casiano et al. "Liquid-Propellant Rocket Engine Throttling: A Comprehensive Review" Journal of Propulsion and Power, vol. 26, No. 5, Sep.-Oct. 2010.

Hulka et al. "Instability Phenomena in Liquid Oxygen/Hydrogen Propellant Rocket Engines." American Institute of Aeronautics and Astronautics. Chapter 2. pp. 39-71. 1994.

J.M. Watts, E.B. Coy (AFRL/PRSA) Experimental Investigation of the Constant-Volume Pulsed Rocket Concept (PostPrint). Technical Paper. Air Force Research Laboratory (AFMC) Nov. 22, 2005.

* cited by examiner

LIQUID ROCKET ENGINE INJECTOR WITH VARIABLE FLOW AREA

CROSS-REFERENCE TO RELATED APPLICATION

Any and all applications for which a foreign or domestic priority claim is identified in the Application Data Sheet as filed with the present application are hereby incorporated by reference under 37 CFR 1.57. For example, the present application is a continuation of U.S. patent application Ser. No. 18/313,137, filed on May 5, 2023, and titled "LIQUID ROCKET ENGINE INJECTOR WITH VARIABLE FLOW AREA," which is a continuation of U.S. patent application Ser. No. 17/453,580, filed on Nov. 4, 2021, now U.S. Pat. No. 11,643,995 issued on May 9, 2023, and titled "LIQUID ROCKET ENGINE INJECTOR WITH VARIABLE FLOW AREA," the entire content of each of which is incorporated by reference herein and forms a part of this specification for all purposes.

BACKGROUND

Field

This development relates to rocket engines, in particular to liquid rocket engine injectors.

Description of the Related Art

Liquid rocket engines allow for throttled thrust. However, deep-throttling of the engine can create challenges for propellant injectors. One challenge of deep throttling a rocket engine is minimizing the pressure drop across the injector, while avoiding coupling between the feed system and the thrust chamber. There is a need for improved injectors that address these and other challenges with liquid rocket injectors.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to injectors for rocket engines.

A rocket combustion chamber injector having a passively varying flow area is described. The injector comprises a housing, a poppet, a spring and a bellows. The housing comprises a sidewall extending along a longitudinal axis between a proximal end and a distal end, where the sidewall is comprising a variable inner width portion and a plurality of ports arranged radially about the longitudinal axis near the variable inner width portion, and the plurality of ports are configured to receive a propellant along a propellant flow path that extends from the plurality of ports towards the distal end of the housing. The poppet extends axially between a proximal end and a distal end, the poppet is moveable within the housing along the longitudinal axis, the distal end of the poppet has a variable outer width portion located radially inwardly of the variable inner width portion of the housing to define therebetween an annular flow area of the propellant flow path, and the variable outer width portion is configured such that propellant flowing along the propellant flow path around the variable outer width portion applies a first axial force on the distal end of the poppet. The spring is coupled to the proximal end of the poppet within the housing and is configured to apply a second axial force on the proximal end of the poppet. The bellows is located within a cavity at the proximal end of the housing, the cavity is configured to receive propellant therein, the bellows is coupled to the proximal end of the poppet and located outside of the propellant flow path, and the bellows comprises a plurality of openings through which propellant is configured to be transmitted to dampen movement of the poppet along the longitudinal axis. The poppet is configured to move toward the distal end of the housing in response to the first axial force exceeding the second axial force and thereby increase the annular flow area, and the poppet is configured to move toward the proximal end of the housing in response to the second axial force exceeding the first axial force and thereby decrease the annular flow area.

There may be a variety of embodiments of the above and other aspects. The injector may further comprise an orifice holder supporting an orifice that is in fluid communication with the cavity at the proximal end of the housing. The injector may further comprise a first hard stop and a second hard stop configured to limit axial travel of the poppet within the housing to thereby limit a maximum area and a minimum area of the annular flow area. The injector may further comprise a guide within the housing configured to radially support the poppet during axial movement of the poppet through the guide. A ratio of A) a pressure drop across the injector to B) a pressure within a combustion chamber in fluid communication with the injector, may be maintained within a target range across a range of flow rates. The ratio may be controlled within a target range of 15% to 25% across the range of flow rates.

In another aspect, a rocket combustion chamber injector having a passively varying flow area is described. The injector comprises an elongated housing, an elongated poppet, a spring and a bellows. The elongated housing extends from a proximal end to a distal end to define a longitudinal axis, and the housing comprises a variable inner width portion and a plurality of ports arranged proximally of and adjacent to the variable inner width portion and partially defining a propellant flow path that exits out the distal end of the housing. The elongated poppet is supported within the housing and moveable axially, and the poppet comprises a variable outer width portion located radially inwardly of the variable inner width portion of the housing to define therebetween an annular flow area of the propellant flow path. The spring is located within the housing and is configured to bias the poppet in a proximal direction. The bellows is located within a cavity at the proximal end of the housing and located outside of the propellant flow path, and the cavity is configured to be filled with propellant. The poppet is configured to move in a distal direction in response to an increased propellant flow along the propellant flow path to thereby increase the annular flow area and to move in the proximal direction in response to a decreased propellant flow along the propellant flow path to thereby decrease the annular flow area.

There may be a variety of embodiments of the above and other aspects. The variable inner width portion may increase in inner width in the distal direction. The plurality of ports may be arranged radially about the longitudinal axis. The propellant flow path may bend from the plurality of ports toward the distal end of the housing. The variable outer width portion of the poppet may increase in outer width in the distal direction. The variable outer width portion of the poppet may be configured such that propellant flowing along the propellant flow path around the variable outer width portion applies a first axial force in the distal direction on the variable outer width portion of the poppet. The spring may be configured to apply a second axial force in the proximal direction on the poppet. The increased propellant flow along the propellant flow path may cause the first axial force to exceed the second axial force to thereby move the poppet in the distal direction. The decreased propellant flow along the propellant flow path may cause the second axial force to exceed the first axial force to thereby move the poppet in the proximal direction. The bellows may comprise a plurality of openings through which propellant is configured to be transmitted to dampen movement of the poppet along the longitudinal axis. The bellows may be located proximally of the poppet and provide a damping force to a proximal end of the poppet. A ratio of A) a pressure drop across the injector to B) a pressure within a combustion chamber in fluid communication with the injector, may be maintained within a target range across a range of flow rates. The ratio may be controlled within a target range of 15% to 25% across the range of flow rates.

In another aspect, a rocket combustion chamber is described. The rocket combustion chamber comprises an injector plate and a plurality of variable flow area injectors. The plurality of variable flow area injectors are configured to inject propellant through the injector plate. Each variable flow area injector comprises an elongated housing, an elongated poppet, a spring, and a bellows. The elongated housing extends from a proximal end to a distal end to define a longitudinal axis, and the housing comprises a variable inner width portion and a plurality of ports arranged proximally of and adjacent to the variable inner width portion and partially defining a propellant flow path that exits out the distal end of the housing. The elongated poppet is supported within the housing and is moveable axially, and the poppet comprises a variable outer width portion located radially inwardly of the variable inner width portion of the housing to define therebetween an annular flow area of the propellant flow path. The spring is located within the housing and is configured to bias the poppet in a proximal direction. The bellows is located within a cavity at the proximal end of the housing and is located outside of the propellant flow path, and the cavity is configured to be filled with propellant. The poppet is configured to move in a distal direction in response to an increased propellant flow along the propellant flow path to thereby increase the annular flow area and to move in the proximal direction in response to a decreased propellant flow along the propellant flow path to thereby decrease the annular flow area.

In another aspect, a method of injecting propellant into a rocket combustion chamber is described. The method comprises increasing a propellant flow through a plurality of ports of a housing of an injector along a propellant flow path that at least partially extends in a distal direction, impinging the propellant flow on a variable outer width portion of an axially moveable poppet, moving the poppet distally such that the variable outer width portion of the poppet moves distally within a variable inner width portion of the housing to increase an annular flow area therethrough, decreasing the propellant flow through the plurality of ports, biasing the poppet in a proximal direction using a compression spring, dampening movement of the poppet with a bellows in a propellant-filled cavity that is separate from the propellant flow path, and moving the poppet proximally such that the variable outer width portion of the poppet moves proximally within the variable inner width portion of the housing to decrease the annular flow area therethrough. In some embodiments, the further comprises flowing the propellant radially through the plurality of ports and axially out of a distal end of the injector.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein are embodiments of injectors for a liquid rocket propulsion system. The injector passively varies the cross-sectional area of fluid flow across the injector as the throttle is increased and decreased. The area changes based in part on the velocity of the fluid flow—the higher the velocity, the larger the area, and vice versa. The area is larger in part because a poppet or bluff body moves more in the higher velocity flow, thus increasing the flow area. The injector may include hard stops for the poppet that provide minimum and maximum flow areas. In some embodiments, the poppet does not rest on the hard stops, so that flow area is continuously varied.

DETAILED DESCRIPTION

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the present disclosure.

Figure 1A:
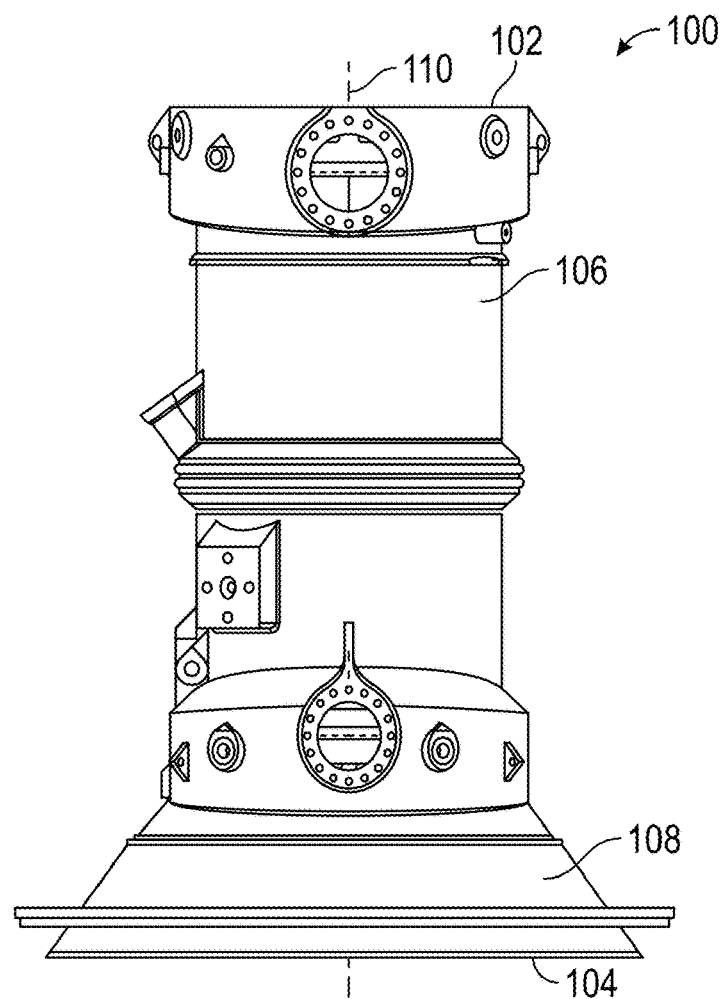
FIG. 1A is a side view of an embodiment of rocket combustion chamber.

FIG. 1A is a side view of an embodiment of rocket combustion chamber 100. The chamber extends from a proximal end 102 to a distal end 104. The chamber 100 includes a barrel portion 106 and a nozzle portion 108 located at a distal end of the barrel portion 106. The chamber 100 defines a longitudinal chamber axis 110 as shown.

Figure 1B:
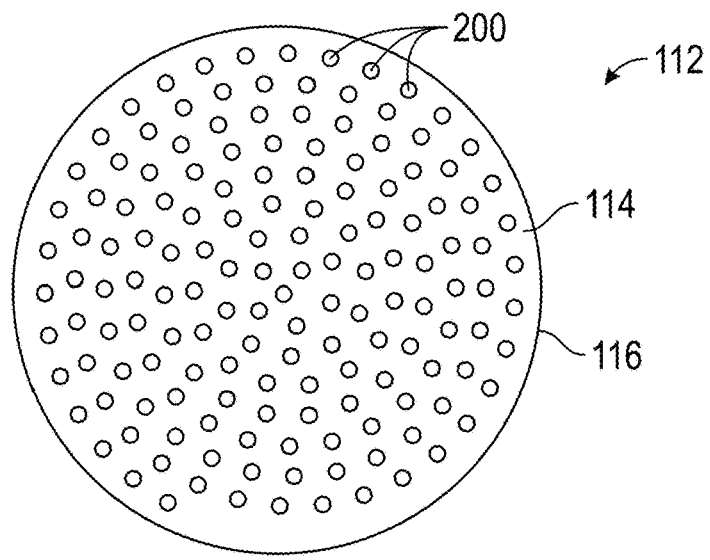
FIG. 1B is an end of view of an embodiment of a rocket injector plate of the chamber of FIG. 1A and having a plurality of variable flow area injectors.

FIG. 1B is an end of view of an embodiment of a rocket injector plate 112. The plate 112 may be implemented in the chamber 100 of FIG. 1A. The plate 112 may be located at or near the distal end 102 of the chamber 100 when assembled with the chamber 100. The plate 112 has a top surface 114 and an outer edge 116. The top surface 114 may be substantially planar and perpendicular to the chamber axis 110 when assembled. The edge 116 may be circular.

The plate 112 includes a plurality of variable flow area injectors 200. For clarity, only some of the injectors 200 are labelled in FIG. 1B. Some or all of the injectors 200 may be longitudinally oriented at an angle to the chamber axis 110. In some embodiments, the injectors 200 may be oriented axially, radially, angled, other orientations, or combinations thereof.

The injectors 200 may form a number of small diameter flow paths arranged in patterns through which the fuel and oxidizer travel. For example, the flow paths can be arranged in carefully constructed patterns that optimize the flow of fuel and oxidizer through the flow paths. The speed of the flow may be determined by the square root of the pressure drop across the injectors 200, the shape of the flow paths and/or openings in the injector plate 112, and other factors such as the density of the propellant.

The injectors 200 and/or injector plate 112 may include a number of holes. The holes may range in width or diameter from about 0.125 inches (in.) to about 1 in, from about 0.25 in. to about 0.75 in., from about 0.375 in. to about 0.5 in., or other larger or smaller sizes. The holes may be oriented to aim jets of fuel and oxidizer to collide. The jets may collide at a point in space a distance away from the injector plate 112. The jets may collide at a distance of no more than 0.5 in, 1 in., 2 in., 3 in., 4 in., 5 in., 10 in., 20 in., or other distances, from the plate 112. This helps to break the flow up into small droplets that burn more easily. The injectors 112 may be arranged to form a variety of different injector layouts, such as shower head, self-impinging doublet, cross-impinging triplet, centripetal or swirling, pintle, other suitable arrangements, or combinations thereof.

Figure 2A:
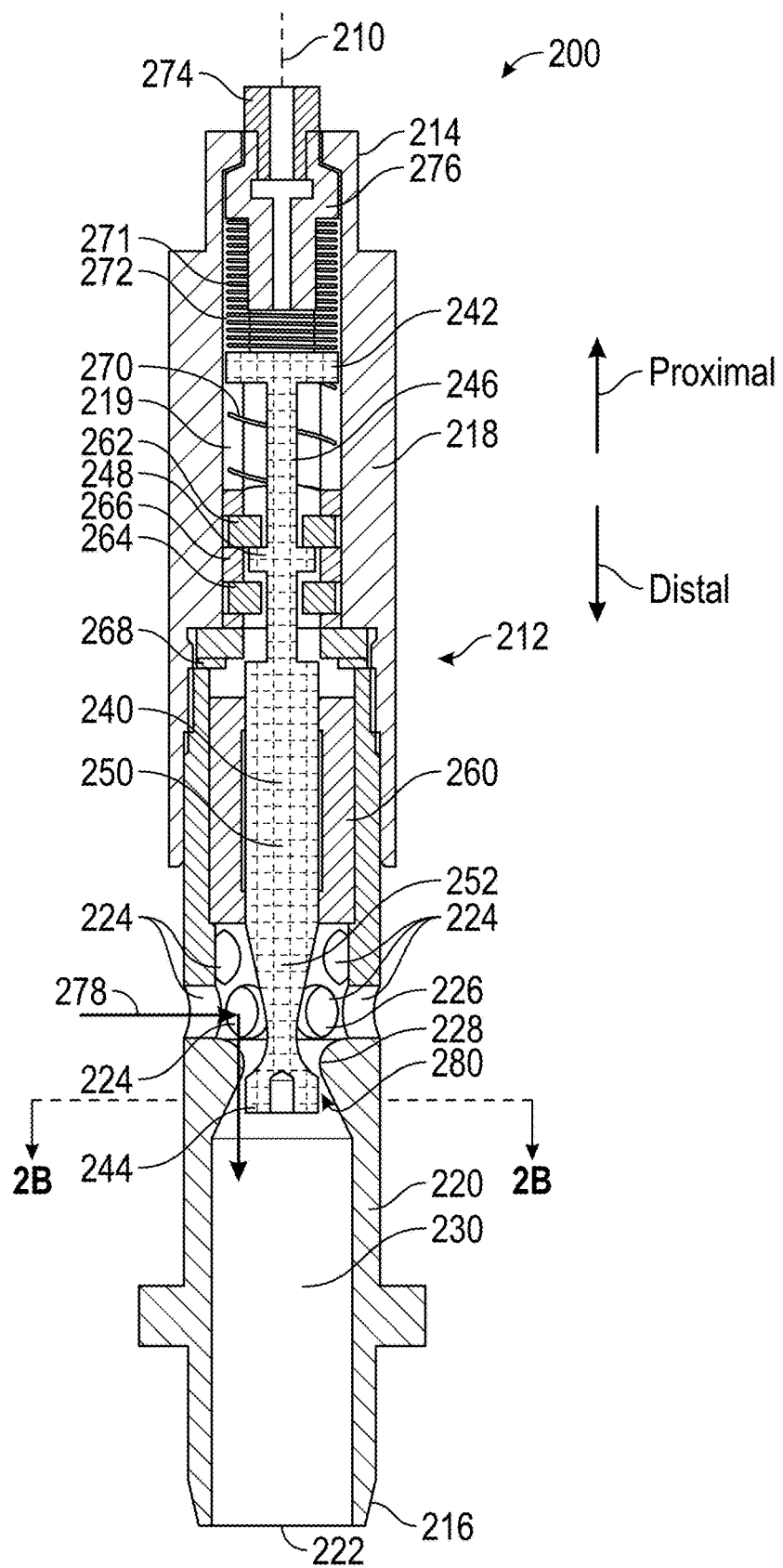
FIG. 2A is a cross-sectional view of the variable flow area injectors of FIG. 1B.

FIG. 2A is a cross-sectional view of an example variable flow area injector 200 according to the present disclosure. The injector 200 is elongated and extends along a longitudinal axis 210. The injector 200 includes a housing 212. The housing 212 provides a structural cover and support to the injector 200. The housing 212 extends from a proximal end 214 to a distal end 216. The distal end 216 may be positioned at a chamber of a rocket engine to expel propellant through an outlet 222 and into the chamber for combustion therein. The housing 212 includes a proximal portion 218 and a distal portion 220. The proximal and distal portions 218, 220 may be separate parts that attach together, or the housing 212 may be unibody. "Proximal" and "distal" refer to the directions as shown in FIG. 2A.

The housing 212 includes a plurality of ports 224 through which propellant flows into the injector 200. There may be one, two, three, four, five, six, seven, eight, nine, ten or more ports 224. The ports 224 may be openings in a sidewall of the housing 212, such as in the distal portion 220. The ports 224 may be located annularly on all sides of the housing 212. The ports 224 as shown define openings through which propellant flows radially or substantially radially. "Radial" refers to a direction perpendicular to the axis 210. The housing 212 includes an upstream chamber 226. The chamber 226 may receive the propellant and be located upstream of a variable flow area 280 described in detail below. The ports 224 may open into the chamber 226.

The housing 212 may include a variable inner width portion 228. The portion 228 may be located distally of the chamber 226. The portion 228 may increase in width, e.g. diameter, along the distal direction. The portion 228 may include a proximal lip as shown such that the cross-sectional area decreases slightly before increasing in the distal direction. The cross-sectional area of the housing 212 may thus increase in a section that is distal to the proximal lip. In some embodiments, there may not be a lip, and so the cross-sectional area of the housing 212 may increase in the distal direction from the chamber 226. The portion 228 may have a nozzle-opening type shape with a minimum width throat portion, which may be located closer to the proximal end of the portion 228 than to the distal end. The portion 228 may be conical or funnel-shaped. The portion 228 opens into the downstream chamber portion 230. The portion 230 may be cylindrical as shown. The portion 230 may have a constant cross-sectional area. The portion 230 ends in the circular outlet 222.

The injector 200 includes a poppet 240. The poppet 240 extends distally from a flange 242 at a proximal end thereof. The flange 242 is at the proximal end of an elongated first portion 246. The first portion 246 includes a flange 248 located along the length of the first portion 246. At a distal end of the first portion 246 is a relatively wider second portion 250. The second portion 250 extends into the chamber 226. The second portion 250 narrows in width to a neck 252.

The poppet 240 includes a variable outer width portion 244. The portion 244 may be located at a distal end of the poppet 240 as shown. The portion 24 may connect to the neck 252. The portion 244 increases in outer width in a distal direction. The portion 244 may have a conical or funnel shape. The portion 244 may include a constant-width or constant-diameter cylindrical portion located distally of the increasing-width portion. The portion 244 may be hollow or have a bore therein, for example to reduce weight and improve moving response time of the poppet 240.

The injector 200 includes a variable flow area 280. The area 280 may be an annular area. The area 280 may be formed between the variable inner width portion 228 of the housing 212 and the variable outer width portion 244 of the poppet 240. As described in further detail herein, for example with respect to FIGS. 2B and 2C, movement of the poppet 240 in an axial direction may vary the size of the area 280 and thus control the propellant flow mass rate through, and pressure drop across, the injector 200.

The injector 200 includes a guide 260. The guide 260 may be an elongated, cylindrical structure with an opening therethrough configured to receive the poppet 240 and radially guide the poppet 240 as it moves axially. The guide 260 may be formed of TEFLON™, other suitable materials, or combinations thereof. The guide 260 may be located proximally of the ports 224. Inner surfaces of the guide 260 may slide against outer surfaces of and axially direct the wider second portion 250 of the poppet 240. The guide 260 may center the poppet 240. In some embodiments, flexural bearings may be used to center the poppet 240, either alternatively or in addition to the guide 260.

The injector 200 may include first and second stops 262, 264. The stops 262, 264 are inwardly protruding structures, e.g. discs or other suitable projections, that limit axial travel of the poppet 240. The first stop 262 limits proximal movement of the poppet 240, and the second stop 264 located distally of the first stop 262 limits distal movement. The stops 262, 264 may limit axial travel of the flange 248 on the poppet 240. The stops 262, 264 are located within the longitudinal proximal channel 219 of the housing 212. The stops 262, 264 may be adjustable to finely control the range of motion of the poppet 240. One or more first shims 266 may be strategically used to control the axial distance between the stops 262, 264. One or more second shims 268 may be used to control the axial placement of the distal portion 220 within the proximal portion 218 of the housing 212. Additional shims may be used in suitable locations, for example distal of the first stop 262, to locate the stops 262, 264 in desirable positions. Positioning of the stops 262, 264 may affect the performance of the injector 200 as further described herein. In some embodiments, the injector 200 may not need shims 266 and/or 268. For example, the stops 262, 264 may be mechanically adjustable within the housing 212. In some embodiments, the injector 200 may include contact sensors at the stops 262, 264 to identify when the poppet 240 contacts the stops 262, 264 and thus when the flow area is at a maximum or minimum, in order to control the throttle.

The injector 200 includes a spring 270. The spring 270 biases the poppet 240. The spring 270 biases the poppet 240 in the proximal direction. The spring 270 may be a compression spring. The spring 270 may be located distally of the proximal flange 242 of the poppet 240 within the channel 219. The spring 270 may be located proximally of the distal portion 220 of the housing 212. The spring 270 may be located proximally of the first and/or second stop 262, 264. The spring 270 may apply a force in the proximal direction against the moveable poppet 240 to restore the position of the poppet 240, as further described herein. The spring 270 may be located separately from the main flow path 278 as shown. The spring 270 may be located within the injector 200 but not in fluid communication with the chamber 226.

The injector 200 includes a bellows 272. The bellows 272 may be a flexible structure configured to compress and elongate. The bellows 272 may have a resilient, zig-zag sidewall. The bellows 272 defines an annular structure as shown. The bellows 272 by alternate expansion and contraction may draw in fluid into a series of openings and expel the fluid out through the openings. The openings may be in the sidewall of the bellows 272. The bellows 272 may be located in a proximal channel portion 271 of the channel 219 of the housing 212, which may be in the proximal portion 218 of the housing 212. The bellows 272 may contact a proximal side of the poppet 240. The bellows 272 extend from a distal end to a proximal end. The distal end of the bellows 272 contacts the proximal side of the flange 242. The proximal end of the bellows 272 contacts a holder 276. The bellows 272 may partially surround a distal end of the holder 276. The holder 276 and flange 242 axially limit movement of the bellows 272. The proximal end of the bellows 272 may be fixed while the distal end of the bellows 272 may move as the poppet 240 moves.

The injector 200 includes an orifice 274. The orifice 274 defines an opening therethrough. Propellant may flow through the opening of the orifice 274 and into the proximal channel portion 271 to be drawn into and expelled out of the bellows 272 through the series of openings in the bellows 272. The orifice 274 is located proximally of the bellows 272. In some embodiments, the orifice 274 may be located directly in the bellows 272. The propellant flow path within the proximal channel portion 271 may be separate from a main propellant flow path that leads to the combustion chamber of the rocket engine, as further described. The same fluid flowing across the injector is used in the bellows 272, such as liquid oxygen (LOX) or liquid natural gas (LNG). In some embodiments, the bellows 272 and the spring 270 may be combined. As shown the bellows 272 is a separate component from the spring 270.

One challenge when incorporating the spring 270 into the injector 200 is that there may be a coupling between the injector 200 and the combustion dynamics. In order to avoid this, high damping may be employed. Fluidic damping using the orifice 274 and the series of openings in the bellows 272 results in high damping. In some embodiments, a transition time from a maximum to a minimum throttle, or vice versa, is about 0.3 seconds. The damping can be varied by changing the orifice size.

The variable volume in the bellows 272 may create impedance for damping out the effects of pressure oscillations in the combustion process. This can be tuned by adjusting the flow area into or out of the volume. Two ways to create that flow are to use an inlet orifice and/or openings in the bellows 272. Forming small holes directly in the baffles can be an economical, low cost approach to creating flow into or out of the volume. Another approach is to use a single precision drilled orifice 274. In some embodiments, a single precision drilled orifice 272 may be used. In some embodiments, single or multiple holes drilled directly into the bellows 272 may be used. The sizing of direct drilled holes in the bellows 272 may provide an equivalent effective flow area as a single orifice.

Figure 2B:
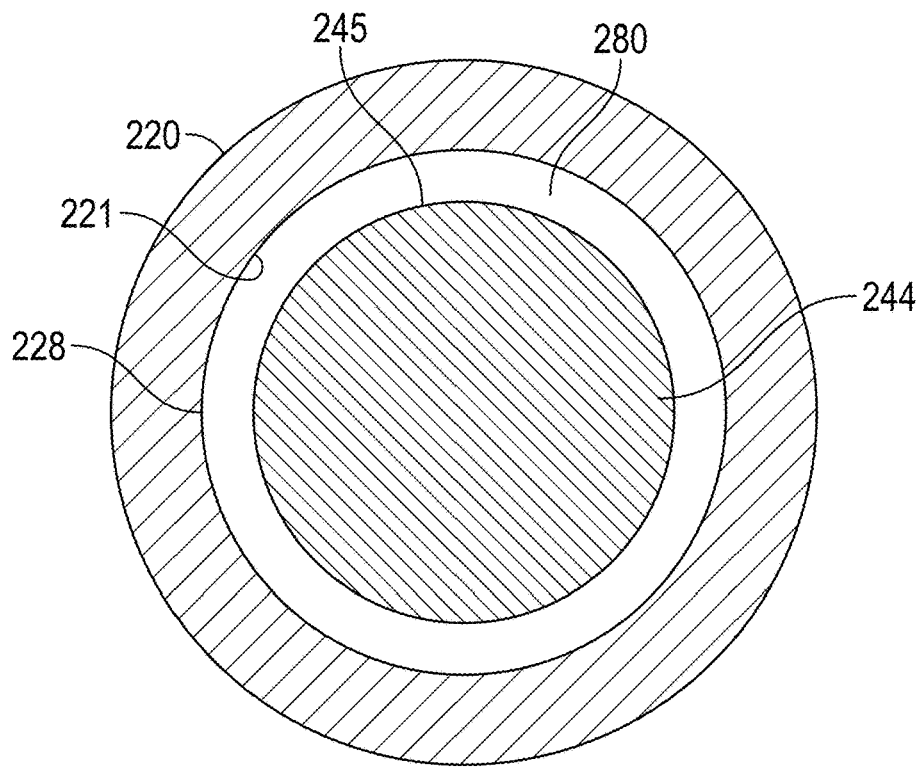
FIGS. 2B and 2C are cross-section views of the injector as taken along the line 2B-2B as indicated in FIG. 2A showing the variable annular flow area, respectively, with smaller and larger flow areas.
Figure 2C:
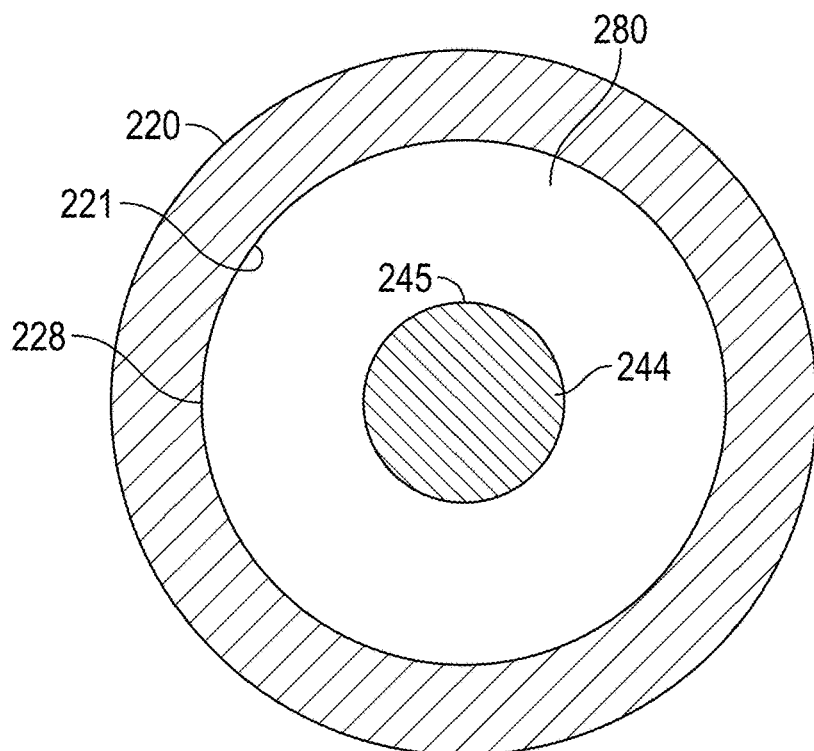

The injector 200 defines a main propellant flow path 278. The propellant may be any fuel or oxidizer, such as LOX, hydrogen, LNG, kerosene or hypergols. The path 278 extends through the ports 224, but only one flow path 278 extending through one port 224 is shown for clarity. The path 278 extends through the ports 224, into the upstream chamber 226, through the variable inner width portion 228, and into the downstream chamber portion 230 through the outlet 222. The portion of the flow path 278 extending between the variable inner width portion 228 of the housing 212 and the variable outer width portion 244 of the poppet 240 defines an annular-shaped flow area 280. FIGS. 2B and 2C illustrate how a cross-section of the flow area 280 as taken along the line 2B-2B in FIG. 2A changes as the poppet moves in the distal direction from a first position shown in FIG. 2A to a second position.

FIGS. 2B and 2C are cross-section views of the injector 200 showing the variable annular flow area 280, respectively, with smaller and larger flow areas. The housing 212, such as the distal portion 220 as shown, includes an inner surface 221 defining the variable inner width portion 228. The variable outer width portion 244 of the poppet 240 is defined by an outer surface 245 that is opposing the inner surface 221. The annular flow area 280 is defined between the surfaces 221, 245.

The size of the flow area 280 may be varied by moving the poppet 240 axially. Movement of the poppet 240 in the proximal direction will cause the outer surface 245 of the poppet 245 to be closer to the opposing inner surface 221 of the housing 212, thus decreasing the size of the flow area 280 as shown in FIG. 2B. In contrast, as shown in FIG. 2C, movement of the poppet 240 in the distal direction will cause the outer surface 245 of the poppet 245 to be farther from the opposing inner surface 221 of the housing 212, thus increasing the size of the flow area 280.

The poppet 240 may be moved in the distal direction due to an increased propellant mass flow rate along the main flow path 278. The spring 270 biases the poppet 240 in the proximal direction. In some embodiments, the bellows 272 may also bias the poppet 240 in the proximal direction. The propellant applies a force on the poppet 240 in the distal direction. The propellant may apply a drag force on the poppet 240. The propellant 240 may also apply normal forces on the poppet 240 with force vector components in the distal direction that cause it to move distally. As the mass flow rate of the propellant along the flow path 278 increases, an increasing axial force is exerted on the variable outer width portion 244 of the poppet 240 in the distal direction. When the force in the distal direction to the propellant flow is greater than the force in the proximal direction due to the spring 270 (and possibly also due to the bellows 272), then the poppet 240 will move in the distal direction. The mass flow rate through the element at a given pressure drop across the orifice 274 may be increased by increasing the supply pressure to the element.

The poppet 240 may be moved proximally due to a decreased propellant flow along the main flow path 278. As the propellant mass flow rate decreases, at some point the proximal forces from the spring 270 (and possibly the bellows 272) are greater than the distal forces due to the propellant flow, and thus the poppet 240 will move proximally.

As the poppet 240 moves distally due to increased propellant flow, the flow area 280 increases due to increased separation between the opposing surfaces of the poppet 240 and the housing 212, as described. This in turn increases the mass flow rate through the injector 200 and thereby controls (e.g., decreases) the pressure drop across the injector 200, as further described herein. Conversely, as the poppet 240 moves proximally due to decreased propellant flow, the flow area 280 decreases due to decreased separation between the opposing surfaces of the poppet 240 and the housing 212, as described. This in turn decreases the mass flow rate through the injector 200 and thereby controls (e.g., increases) the pressure drop across the injector 200, as further described herein.

Thus, during sufficiently low enough flow velocities, the poppet 240 is forced proximally. The proximal travel of the poppet 240 may be limited by the upper stop 262. Likewise, the poppet 240 moves distally during sufficiently high enough fluid drag forces acting on it. The downward travel of the poppet 240 is limited by the lower stop 264.

One of the significant challenges in producing a deep-throttling engine is managing the pressure drop across the injector 200. Advantageously, the variable flow area 280 of injectors according to the present disclosure may minimize the pressure drop across the injector 200 at maximum flow rates while avoiding coupling between the fluid injector system and the thrust chamber of the rocket engine. Optimization of this pressure drop while avoiding coupling in this manner is an important design requirement for deep throttling rocket engines. In some embodiments, the injector 200 according to the present disclosure may be used as co-axial injectors in a 1.5 Mlbf engine using LOX/LNG and deep throttling to 7%. This represents a significant improvement to injectors for deep-throttling engines.

Advantageously, the injectors 200 of the present disclosure are highly configurable by adjusting various parameters. In some embodiments, the preload force due to the spring 272, the spring rate or elasticity of the spring 272, the diameter of the orifice 274, the minimum flow area 280 and/or the maximum flow area 280 may be configured for optimal performance in particular engines. The preload force in the compression spring 272 may be from about 0.5 pound-force (lbf) to about 10 lbf, from about 1 lbf to about 5 lbf, from about 1.25 lbf to about 4.5 lbf, from about 1.5 lbf to about 4 lbf. The spring rate may be from about 5 pound-force per inch (lbf/in) to about 150 lbf/in, from about 7.5 lbf/in to about 125 lbf/in, from about 10 lbf/in to about 110 lbf/in, from about 25 lbf/in to about 75 lbf/in. The annular flow area 280 may have a minimum flow area from about 0.008 square inches ($in^2$) to about 0.100 $in^2$, from about 0.010 $in^2$ to about 0.050 $in^2$, or from about 0.016 square inches ($in^2$) to about 0.025 $in^2$. The annular flow area 280 may have a maximum flow area from about 0.017 square inches ($in^2$) to about 0.250 $in^2$, from about 0.025 $in^2$ to about 0.200 $in^2$, from about 0.030 square inches ($in^2$) to about 0.150 $in^2$, or from about 0.035 square inches ($in^2$) to about 0.125 $in^2$. It will be understood that these ranges are example implementations and that other preload forces, spring rates, and annular flow areas can be suitably implemented in accordance with the present disclosure.

Over the entire throttle range, the pressure drop across the injector ($\Delta P$) needs to be high enough to avoid coupling between the thrust chamber and the feed system. This minimum value is engine dependent and needs to be determined through testing, but a rule of thumb is that the dimensionless pressure drop, $\Delta P/P_C$, is above 15%, preferably above 20%, where $P_C$ is the pressure in the rocket engine combustion chamber. The $\Delta P/P_c$ versus throttle profile is highly tuneable in embodiments of the present disclosure. Various modes of operation may be demonstrated by adjusting the spring rate, preload force, and stop positions. For example, the injector 200 can be adjusted to have the lowest allowable $\Delta P/P_c$ at high throttle, with providing near constant $\Delta P/P_c$ at lower throttles, decreasing susceptibility to combustion instabilities without penalizing performance of the engine with high injector pressure drop at full power. As a further example, in the event that the combustor does not run stably when the poppet 240 is not resting on a stop, the injector 200 can be configured to run with a keep-out zone, where the poppet 240 is resting on a stop for most of the throttle range.

Figure 3A:
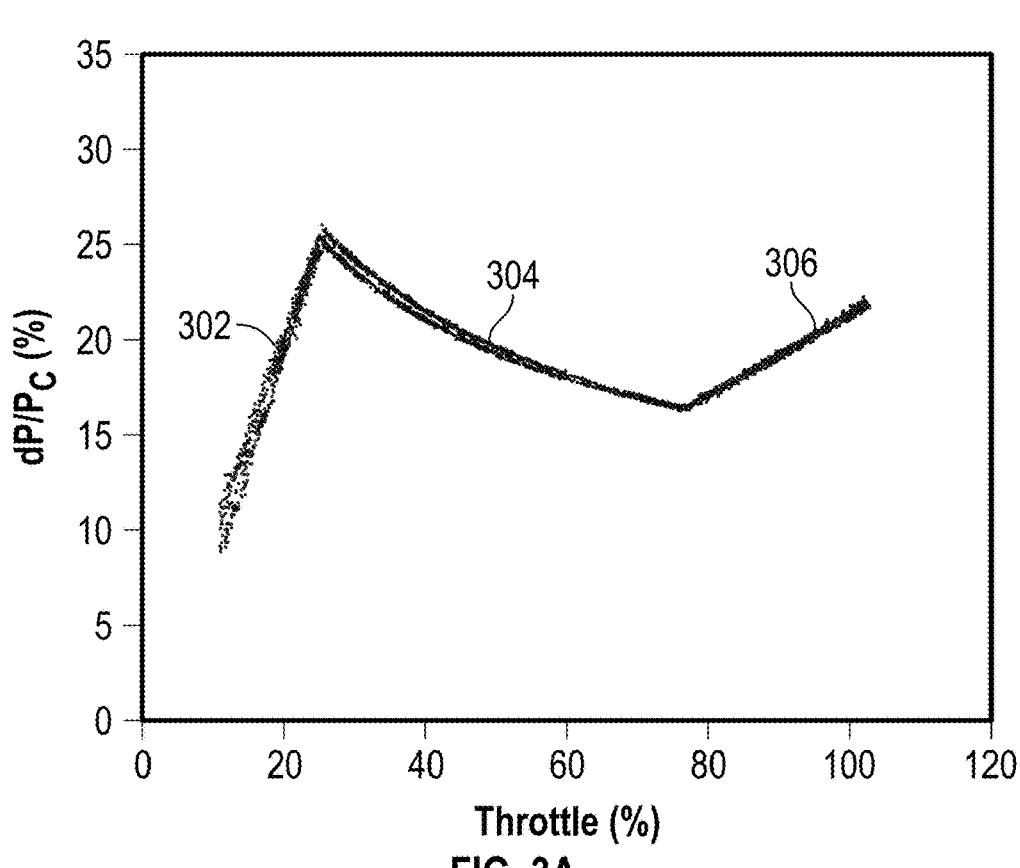
FIGS. 3A-3C are various data plots showing the pressure drop across the injector versus a range of throttling levels, as well as predictive data from an analytical model, for various embodiments of the injector of FIG. 2A.

FIG. 3A is a data plot 300 showing the pressure ratio $\Delta P/P_c$ as a percentage (%) versus throttle percentage (%) for an embodiment of the injector 200 and having stops 262, 264. The data plot 300 has a first portion 302 corresponding to the poppet 240, for example the flange 248, bottomed out on the proximal hard stop 262 and thus having a minimum flow area 280. A second portion 304 of the data plot 300 corresponds to the poppet 240, for example the flange 248, floating between and not contacting either of the hard stops 262, 264, and thus having a variable flow area 280 that increases as the throttle % increases. A third portion 304 of the data plot 300 corresponds to the poppet 240, for example the flange 248, bottomed out on the distal hard stop 264 and thus having a maximum flow area 280. As shown, the $\Delta P/P_c$ is greater than about 15% over substantially the entire range of throttling, and over the entire range of high throttling. The $\Delta P/P_c$ may be kept between about 15% and about 25% over substantially the entire range of throttling. The $\Delta P/P_c$ may be greater than 15% for throttle percentages greater than about 20%. The $\Delta P/P_c$ may be greater than 15% for throttle percentages greater than about 50%, greater than about 60%, greater than about 70%, greater than about 80%, or greater than 90%. At full throttle or 100%, the $\Delta P/P_c$ may be greater than 15% or greater than 20%.

Figure 3B:
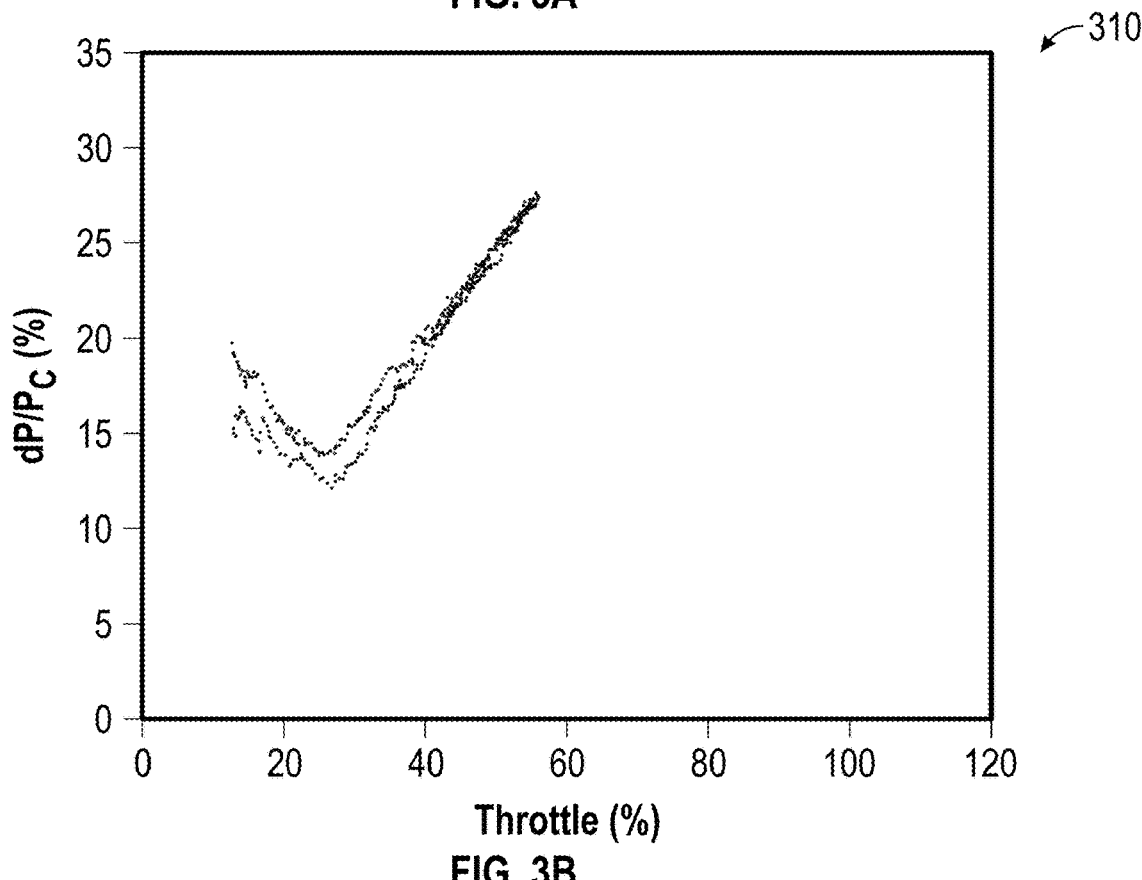

FIG. 3B is a data plot 310 showing the pressure ratio $\Delta P/P_c$ as a percentage (%) versus throttle percentage (%) for an embodiment of the injector 200 at low throttle and having stops 262, 264. The $\Delta P/P_c$ increases to about 15% throttle and then decreases after the poppet 240 begins to move due to the increased propellant flow. Then, the $\Delta P/P_c$ decreases to a lower limit at about 30% throttle, due to the hard stop not allowing the flow area to increase any more. With the flow area 280 at a maximum, the $\Delta P/P_c$ then continually increases as the throttle continues to increase.

Figure 3C:
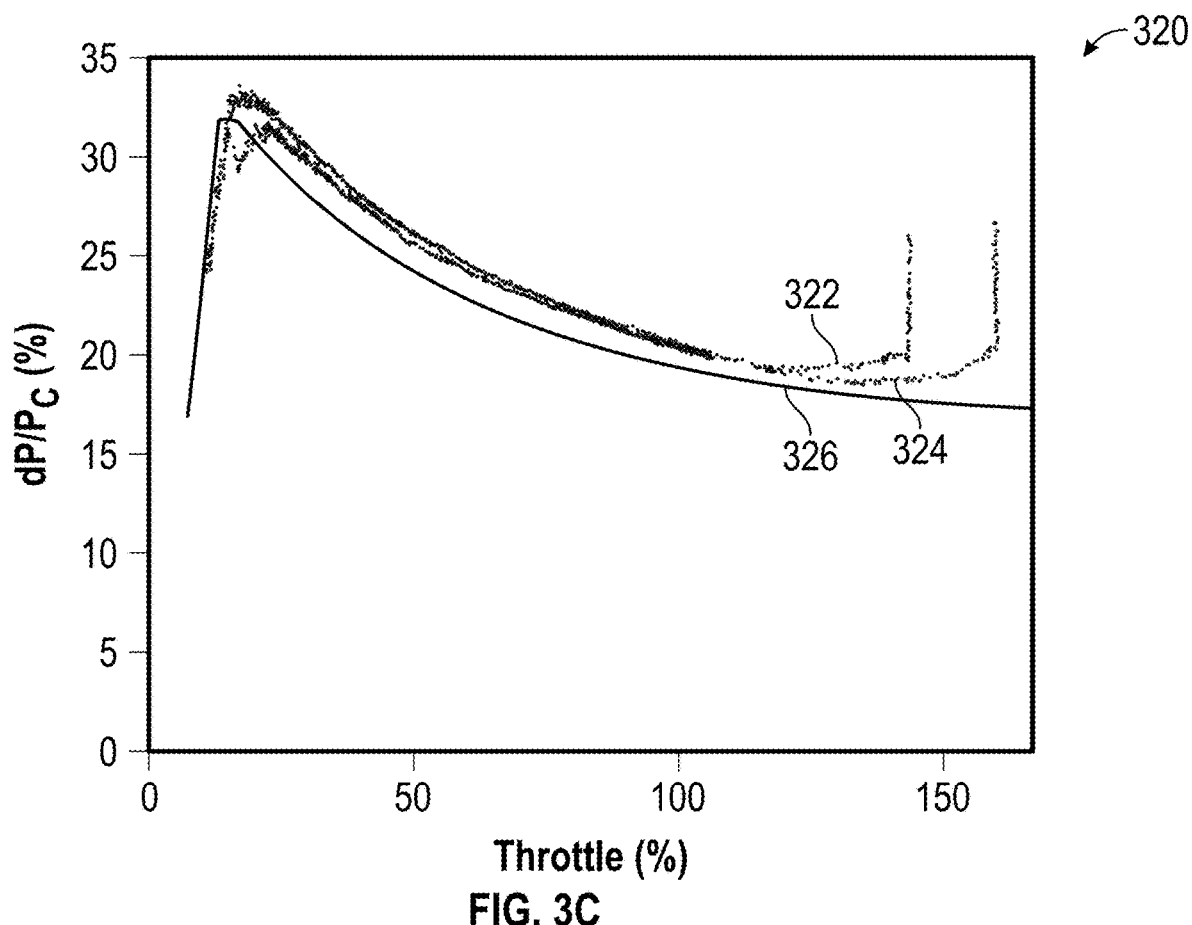

FIG. 3C is a data plot 320 showing $\Delta P/P_c$ as a percentage (%) versus throttle percentage (%) for an embodiment of the injector 200 with continuously varying flow area 280. A first set of data 322 is shown corresponding to a manifold pressure of about 600 pounds per square inch absolute (psia), and a second set of data 324 is shown corresponding to a manifold pressure of about 680 psia. The injector 200 was able to flow well above 150% throttle level while maintaining a $\Delta P/P_c$ of just over the desired 15% level. Due to the large pressure drop across the injector 200 at these high throttle levels, cavitation began to occur, and at the vertical lines the flow becomes choked due to cavitation. In addition, $\Delta P/P_c$ was increased at lower throttle levels, which would yield increased resistance to combustion instability. The $\Delta P/P_c$ increases to about 20% throttle and then gradually and continually decreases after the poppet 240 begins to move due to the increased propellant flow. The $\Delta P/P_c$ decreases continually since there is no hard stop to limit the flow area, and thus the flow area continues to increase as the throttle % and propellant flow increases. The $\Delta P/P_c$ continually approaches a horizontal asymptote located between 15% and 20%, e.g. at about 17%.

FIG. 3C further shows a third set of data 326 showing predicted results from an analytical model of the injector 200. In some embodiments, the injector 200 may be designed to have a desired pressure drop profile. The design may be based on an equation (1) of motion for the poppet 240. The equation (1) may be the following:

$$m\ddot{x} = B_p \frac{\rho u_p^2}{2} - (kx + F_P) - \text{sign}(\dot{x})\left(\frac{\rho \overline{B}_b^2 B_b}{2(A_b C_{d,b})^2}\right)\dot{x}^2 \quad (1)$$

In equation (1), m is the mass of the poppet 240, $\ddot{x}$ is the acceleration of the poppet 240, $B_p$ is the base area of the poppet 240, $\rho$ is the density of the injected propellant, up is the maximum propellant velocity at the minimum area location of the poppet 240, k is the restoring force due to the combination of the spring 270 and bellows 272, x is the location of the poppet 240 as measured from a no-flow preloaded position of the poppet 240, $F_P$ is the preload force on the poppet 240, $\dot{x}$ is the velocity of the poppet 240, sign($\dot{x}$) is the mathematical positive (+) or negative (−) sign of the value of $\dot{x}$, $B_b$ is the base area of the bellows 272 and $\overline{B}_b$ is the mean base area of the bellows 272, where the mean base area multiplied by the height of the bellows 272 gives the volume, to take into account the convolutions or corrugations in the wall of the bellows 272, $A_b$ is the area of the bellows orifice, and $C_{d,b}$ is the discharge coefficient of the bellows orifice which can be calibrated using test data.

Using equation (1), the behavior of the injector 200 can be estimated. A model based on equation (1) can estimate the forces on the poppet 240 and determine its position and the pressure drop across the injector 200.

The third set of data 326 in FIG. 3C shows the pre-test prediction using a calibrated model, which shows close correlation with the test sets of data 322, 324. The model based on equation (1) of motion for the poppet can be used to tune the pressure drop versus throttle to any desired profile.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. An injector for a rocket combustion chamber, the injector comprising:
    a housing defining a longitudinal axis and having a proximal end and a distal end, the housing defining a variable inner width;
    a poppet configured to move within the housing along the longitudinal axis, wherein a variable annular flow path for a propellant is located between a variable outer width of the poppet and the variable inner width of the housing; and
    a spring configured to bias the poppet along the longitudinal axis,
    wherein movement of the poppet toward the proximal end causes a cross-sectional area of the variable annular flow path to decrease, and wherein movement of the poppet toward the distal end causes the cross-sectional area of the variable annular flow path to increase, and
    wherein the housing further comprises a plurality of ports distributed annularly about the housing through which the propellant enters the housing.

2. The injector of claim 1, wherein the plurality of ports are upstream of the variable annular flow path.

3. The injector of claim 1 further comprising a bellows configured to dampen movement of the poppet.

4. The injector of claim 3, wherein the bellows is positioned at the proximal end of the housing.

5. The injector of claim 3, wherein the bellows comprises one or more openings configured to allow propellant to flow into and out of an interior of the bellows along a flow path that is outside of the variable annular flow path.

6. The injector of claim 1, wherein the spring causes a first force on the poppet biasing the poppet toward the proximal end, and wherein a flow of the propellant along the variable annular flow path causes a second force on the poppet biasing the poppet toward the distal end.

7. The injector of claim 1 further comprising a first stop and a second stop configured to limit travel of the poppet along the longitudinal axis within the housing to thereby limit a maximum area and a minimum area of the variable annular flow path.

8. An injector for a rocket combustion chamber, the injector comprising:
    a flow path configured for a propellant to flow therethrough, the flow path bounded outwardly by an inner surface of a housing protruding inwardly, the inner surface having a variable housing width section along a longitudinal direction, the flow path bounded inwardly by an outer surface of a poppet protruding outwardly, the outer surface having a variable poppet width section along the longitudinal direction, the variable housing width section and the variable poppet width section defining therebetween a variable annular flow path section; and
    a spring disposed at a proximal end of the housing and causing a biasing force on the poppet,
    wherein movement of the poppet toward the proximal end of the housing along the longitudinal direction causes a reduction in a cross-sectional area at a first location of the variable annular flow path section, and movement of the poppet toward a distal end of the housing along the longitudinal direction causes an increase in the cross-sectional area at the first location of the variable annular flow path section.

9. The injector of claim 8, wherein movement of the poppet toward the proximal end causes the outer surface of the poppet to move closer to the inner surface of the housing, and wherein movement of the poppet toward the distal end causes the outer surface of the poppet to move away from the inner surface of the housing.

10. The injector of claim 8 further comprising entrance ports distributed about a sidewall of the housing upstream of the variable annular flow path section and configured to receive the propellant therethrough.

11. The injector of claim 8, wherein the cross-sectional area at the first location of the variable annular flow path section is circular.

12. The injector of claim 8, wherein the cross-sectional area at the first location of the variable annular flow path section has a maximum cross-sectional area of no more than about 0.250 in$^2$ and a minimum cross-sectional area of no less than about 0.008 in$^2$.

13. The injector of claim 8 further comprising a bellows configured to dampen movement of the poppet and comprising a series of openings configured to receive propellant into an interior of the bellows.

14. The injector of claim 8, wherein the variable housing width section reduces in width in the longitudinal direction to a minimum width throat portion and increases in width from the minimum width throat portion in the longitudinal direction.

15. The injector of claim 8, wherein the variable poppet width section increases in width to a maximum width portion and then decreases in width from the maximum width portion in the longitudinal direction.

16. A method of passively varying a flow rate of a propellant injected into a rocket combustion chamber, the method comprising:
   receiving the propellant into a housing of an injector, the housing defining a longitudinal axis, a proximal end and a distal end;
   applying a biasing force with a spring to a poppet disposed within the housing; and
   causing a movement of the poppet within the housing along the longitudinal axis in response to a change in flow rate of the propellant,
   wherein the propellant enters the housing at a location between the proximal end and an annular flow area between the poppet and the housing, wherein the movement of the poppet toward the proximal end causes an outer surface of the poppet to move closer to an inner surface of the housing at the annular flow area, and wherein movement of the poppet toward the distal end causes the outer surface of the poppet to move away from the inner surface of the housing at the annular flow area.

17. The method of claim 16 further comprising dampening movement of the poppet with a bellows.

18. The method of claim 16 further comprising varying the biasing force from the spring on the poppet as the poppet moves.

19. The method of claim 16 further comprising maintaining a ratio of A) a pressure drop across the injector to B) a pressure within the rocket combustion chamber in fluid communication with the injector within a target range of 15% to 25% across a range of the flow rate of the propellant.

* * * * *

UNITED STATES PATENT AND TRADEMARK OFFICE
CERTIFICATE OF CORRECTION

PATENT NO. : 12,366,218 B2
APPLICATION NO. : 18/731709
DATED : July 22, 2025
INVENTOR(S) : Mark David Horn Page 1 of 1

It is certified that error appears in the above-identified patent and that said Letters Patent is hereby corrected as shown below:

In the Specification

In Column 11, Line 59, delete "240, x is" and insert --240, $\bar{x}$ is--.

In Column 11, Line 61, delete "propellant, up is" and insert --propellant, $u_p$ is--.

Signed and Sealed this
Sixteenth Day of September, 2025

Coke Morgan Stewart
*Acting Director of the United States Patent and Trademark Office*